(12) United States Patent
Levassort et al.

(10) Patent No.: US 6,872,795 B2
(45) Date of Patent: Mar. 29, 2005

(54) POLY (ETHYNYLENE PHENYLENE ETHYNYLENE POLYSILOXENE(SILYLENE)) AND METHODS FOR PREPARING SAME

(75) Inventors: Christian Levassort, Tours (FR); Franck Jousse, Tours (FR); Laurent Delnaud, Ballan Mire (FR); Pierrick Buvat, Montbazon (FR)

(73) Assignee: Commissariat a l'Energie Atomique, Paris (FR)

( * ) Notice: Subject to any disclaimer, the term of this patent is extended or adjusted under 35 U.S.C. 154(b) by 6 days.

(21) Appl. No.: 10/415,340

(22) PCT Filed: Nov. 9, 2001

(86) PCT No.: PCT/FR01/03493
§ 371 (c)(1),
(2), (4) Date: May 2, 2003

(87) PCT Pub. No.: WO02/38653
PCT Pub. Date: May 16, 2002

(65) Prior Publication Data
US 2004/0024163 A1 Feb. 5, 2004

(30) Foreign Application Priority Data
Nov. 10, 2000 (FR) ............................................ 00 14460

(51) Int. Cl.$^7$ ............................................. C08G 77/60
(52) U.S. Cl. ............................ 528/14; 528/25; 556/431
(58) Field of Search .............................. 528/14, 25, 16, 528/18, 19, 31, 481; 556/431

(56) References Cited

U.S. PATENT DOCUMENTS 5,420,328 A * 5/1995 Campbell .................... 558/110
2004/0030170 A1 * 2/2004 Levassort et al. ........... 556/425

FOREIGN PATENT DOCUMENTS

EP 0 617 073 9/1994
JP 07 076621 3/1995

OTHER PUBLICATIONS

Itoh et al., "New Highly Heat–Resistant Polymers Containing Silicon: Poly(silyleneethynylenephenyleneethynylene)s" published in Macromolecules (1997), vol. 30, pp 694–701.*
M. Itoh et al.: "New highly heat–resistant polymers containing silicon: poly(silyleneethynylenephenylene ethynylene)s" Macromolecules, vol. 30, pp. 694–701 1997.
Robert J. P. Corriu et al. Journal of Polymer Science: Part C: Polymer Letters, vol. 28, pp. 431–437 1990.
H.Q. Liu et al.: "Copper (l) chloride catalyzed cross dehydrocoupling reactions between silanes and ethynyl compounds. A new method for the copolymerization of silanes and alkynes" The Canadian Journal of Chemistry, vol. 68, pp. 1100–1105, 1990.
M. Itoh et al. A novel synthesis and extremely high thermal stability of poly[(phenylsilylene)–(ethynylene–1,3–phenyleneethynylene)] Macromolecules, vol. 27, pp. 7917–7919, 1994.

* cited by examiner

Primary Examiner—Robert Sellers
Assistant Examiner—Marc S. Zimmer
(74) Attorney, Agent, or Firm—Oblon, Spivak, McClelland, Maier & Neustadt, P.C.

(57) ABSTRACT

Heat-stable poly(ethynylene phenylene ethynylene polysiloxene(silylene)) polymers preferably of determined molecular mass, optionally bearing at the end of the chain groups derived from a chain-limiting agent. Processes for preparing these polymers, cured products obtained by heat-treating these polymers, and composite matrices comprising these polymers.

37 Claims, No Drawings

POLY (ETHYNYLENE PHENYLENE ETHYNYLENE POLYSILOXENE(SILYLENE)) AND METHODS FOR PREPARING SAME

The present invention relates to poly(ethynylene phenylene ethynylene polysiloxene(silylene)) polymers.

The present invention relates in particular to poly (ethynylene phenylene ethynylene polysiloxene(silylenes)) of low viscosity and preferably of determined molecular mass.

The invention also relates to processes for preparing said polymers and to the cured products that may be obtained by heat-treating said polymers. The polymers according to the invention may be used especially in matrices for composites.

The technical field of the present invention may be defined as that of heat-stable plastics, i.e. polymers that can withstand high temperatures that may, for example, be up to 600° C.

The industrial needs for such heat-stable plastics have increased enormously in recent decades, in particular in the electronics and aerospace fields.

Such polymers have been developed to overcome the drawbacks of the materials previously used in similar applications.

Specifically, it is known that metals such as iron, titanium and steel have very high heat resistance, but they are heavy. Aluminium is light, but has low heat resistance, i.e. up to about 300° C. Ceramics such as SiC, $Si_3N_4$ and silica are lighter than metals and very heat-resistant, but they are not mouldable. It is for this reason that many plastics have been synthesized, which are light, mouldable and have good mechanical properties; they are essentially carbon-based polymers.

Polyimides have the highest heat resistance of all plastics, with a thermal deformation temperature of 460° C.; however, these compounds, which are listed as being the most stable currently known, are very difficult to use. Other polymers such as polybenzimidazoles, polybenzothiazoles and polybenzoxazoles have even higher heat resistance than that of polyimides, but they are not mouldable and are flammable.

Silicon-based polymers such as silicones or carbosilanes have also been intensively studied. These polymers, such as poly(silylene ethynylene) compounds, are generally used as precursors of ceramics of silicon carbide SiC type, reserve compounds and conductive materials.

It has recently been shown in document [4] that poly [(phenyl silylene)ethynylene-1,3-phenylene ethynylene] (or MSP), prepared by a synthetic process involving polymerization reactions by dehydrocoupling between phenylsilane and m-diethynylbenzene, have remarkably high heat stability. This is confirmed in document [1], which more generally demonstrates the excellent heat-stability properties of poly (silylene ethynylene phenylene ethynylenes) which comprise a repeating unit represented by formula (A) below:

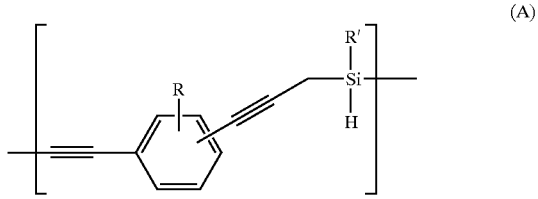

(A)

The synthesis of polycarbosilanes comprising a silane function and a diethynylbenzene via standard processes using metal catalysts leads to polymers of low purity containing large traces of metal catalyst, which greatly impair their thermal properties.

Other improved synthetic processes are presented in document [2]: these are palladium-catalysed syntheses, but they apply only to a very limited number of specific polymers in which the silicon bears two phenyl or methyl groups, for example.

In particular, it will be noted that the compounds whose repeating unit has been described above by formula (A) cannot be synthesized by this process. It is found that the SiH bonds of such compounds that are particularly difficult to obtain are very advantageous since they are extremely reactive and can give rise to numerous rearrangements and reactions.

Another process of cross-dehydrocoupling of silanes with alkynes in the presence of a catalytic system based on copper chloride and an amine is described in document [3]. However, this process is also limited to a few polymers and results in compounds whose structure is partially crosslinked and whose mass-average molecular weight is very high ($10^4$ to $10^5$). These structural defects seriously impair both the solubility properties and the thermal properties of these polymers.

Another synthetic process that is directed towards overcoming the drawbacks of the processes described above, and towards preparing pure compounds, without traces of metals, and with excellent and well-defined properties, especially in terms of heat stability, was proposed in the above-mentioned document [4]. This process essentially allows the synthesis of the compounds of formula (A) above in which the silicon bears a hydrogen atom. The process according to [4] is a polycondensation by dehydrogenation of a functionalized hydrosilane with a compound of diethynyl type in the presence of a metal oxide such as MgO, according to the reaction scheme (B) below:

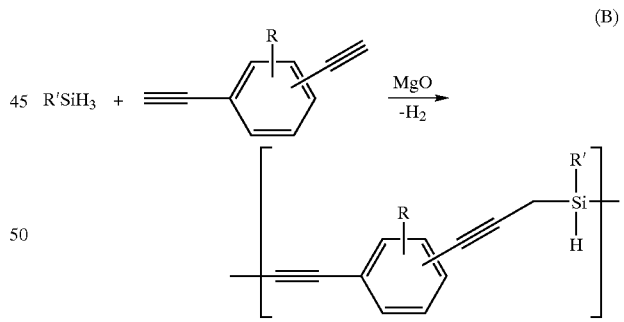

(B)

This process leads to weakly crosslinked polymers having, as represented above, excellent heat stability, but whose mass distribution is, however, very broad.

In another, more recent publication [1], the same authors prepared a series of polymers comprising the —Si(H)—C≡C— unit via process (B) and via another more advantageous process, involving the condensation reaction of dichlorosilane and of organomagnesium reagents followed by reaction of the product obtained with a monochlorosilane, followed by a hydrolysis, according to the reaction scheme (C) below:

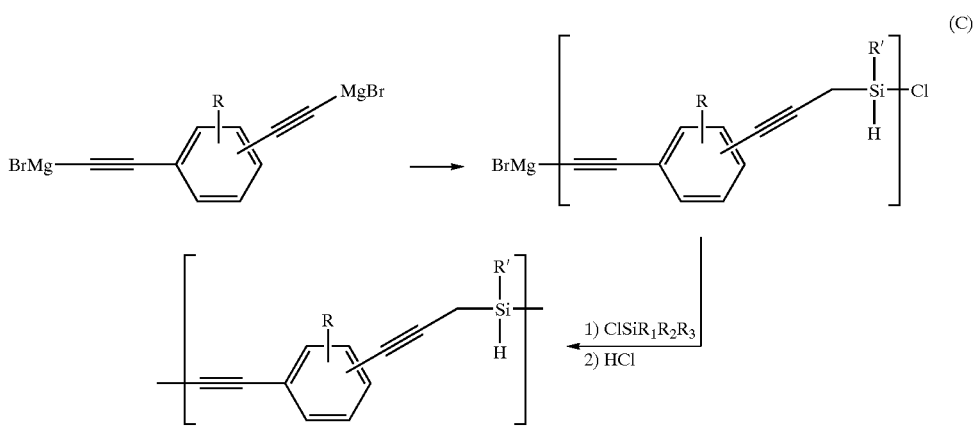

(C)

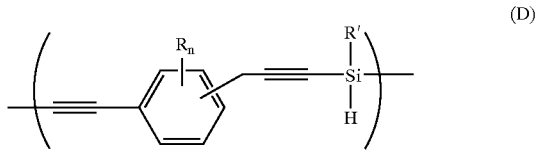

In contrast with process (B), process (C) allows the production of polymers without structural defects, with good yields and a low mass distribution.

The compounds obtained by this process are totally pure and have fully characterized thermal properties. They are thermosetting polymers.

Said document also discloses the preparation of the polymers mentioned above reinforced with glass, carbon or SiC fibres.

A patent relating to polymers comprising the very general repeating unit (D):

(D)

in which R and R' are numerous groups known in organic chemistry, was granted to the authors of documents [1] and [4]; this is document EP-B1-0 617 073 (corresponding to American patent U.S. Pat. No. 5,420,238).

These polymers are prepared essentially by the process of scheme (C) and possibly by the process of scheme (B), and they have a weight-average molecular weight from 500 to 1 000 000. Said document also describes cured products based on these polymers and their preparation by a heat treatment. It is indicated that the polymers in said document can be used as heat-stable polymers, fire-resistant polymers, conductive polymers, and materials for electroluminescent elements. In fact, it appears that such polymers are essentially used as organic precursors of ceramics.

The excellent heat stability of the polymers prepared especially in document EP-B1-0 617 073 makes them capable of constituting the resin forming the organic matrix of heat-stable composite materials with organic matrices.

Many techniques for producing composites exist.

In very general terms, the various processes involve injection techniques (especially RTM) or prepreg compacting techniques.

Prepregs are semi-finished products, of low thickness, consisting of fibres impregnated with resin. Prepregs that are intended for producing high-performance composite structures contain at least 50% fibre by volume.

Also, during use, the matrix will have to have a low viscosity in order to penetrate the reinforcing sheet and correctly impregnate the fibre so as to prevent it from distorting and conserve its integrity. Reinforcing fibres are impregnated either with a solution of resin in a suitable solvent, or with the pure resin melt; this is the "hot-melt" technique. The technology for manufacturing prepregs with a thermoplastic matrix is substantially governed by the morphology of the polymers.

Injection-moulding is a process that consists in injecting the liquid resin into the textile reinforcing agent positioned beforehand in the imprint consisting of the mould and the counter-mould. The most important parameter is the viscosity, which must be between 100 and 1000 mPa.s at the injection temperature, which is generally from 50 to 250° C.

For these two techniques, the viscosity is thus the critical parameter, which conditions the ability of the polymer. to be used.

Amorphous polymers correspond to macromolecules with a totally disordered skeleton structure. They are characterized by their glass transition temperature (Tg) corresponding to the change from the vitreous state to the rubbery state. Above the Tg, the thermoplastics are characterized, however, by great creep strength.

The polymers prepared in document EP-B1-0 617 073 are compounds that are in powder form. The inventors have shown, by reproducing the syntheses described in said document, that the polymers prepared would have glass transition temperatures in the region of 50° C.

Below this temperature, the viscosity of the polymer is infinite, and above this temperature, the viscosity decreases gradually as the temperature is increased.

However, this drop in viscosity is not sufficient for the polymer to be able to be used in processes conventionally used in the field of composites such as RTM and preimpregnation, already described above.

There is thus a need for a polymer whose structure is similar to those described in patent EP-B1-0 617 073, i.e. one having all their advantageous properties, especially the heat stability, but the viscosity of which is low enough for them to be usable, manipulable or "processable" at temperatures of, for example, 100 to 120° C., which are the temperatures commonly used in injection or impregnation techniques.

The aim of the present invention is to provide polymers that satisfy these needs, inter alia, which do not have the defects, drawbacks, limitations and disadvantages of the polymers of the prior art as represented in particular by document EP-B1-0 617 073, and which solve the problems of the prior art.

The aim of the invention is also to provide a process for preparing said polymers.

This aim, and others, is achieved in accordance with the invention by means of a poly(ethynylene phenylene ethynylene polysiloxene(silylene)) polymer, said polymer corresponding to formula (I) below:

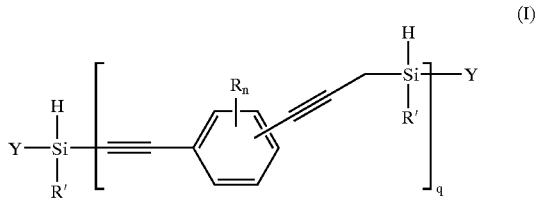

or to formula (Ia) below:

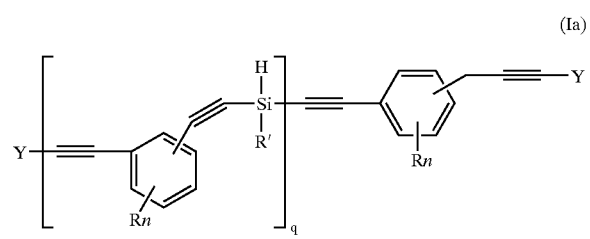

in which the phenylene group of the central repeating unit may be in the o, m or p form; R represents a halogen atom (such as F, Cl, Br or I), an alkyl group (linear or branched) containing from 1 to 20 carbon atoms, a cycloalkyl group containing from 3 to 20 carbon atoms (such as methyl, ethyl, propyl, butyl or cyclohexyl), an alkoxy group containing from 1 to 20 carbon atoms (such as methoxy, ethoxy or propoxy), an aryl group containing from 6 to 20 carbon atoms (such as a phenyl group), an aryloxy group containing from 6 to 20 carbon atoms (such as a phenoxy group), an alkenyl group (linear or branched) containing from 2 to 20 carbon atoms, a cycloalkenyl group containing from 3 to 20 carbon atoms (such as vinyl, allyl or cyclohexenyl), an alkynyl group containing from 2 to 20 carbon atoms (such as ethynyl or propargyl), an amino group, an amino group substituted with one or two substituents containing from 2 to 20 carbon atoms (such as dimethylamino, diethylamino, ethylmethylamino or methylphenylamino) or a silanyl group containing from 1 to 10 silicon atoms (such as silyl, disilanyl ($-Si_2H_5$), dimethylsilyl, trimethylsilyl and tetramethyldisilanyl), one or more hydrogen atoms linked to the carbon atoms of R, may be replaced with halogen atoms (such as F, Cl, Br and I), alkyl groups, alkoxy groups (such as methoxy, ethoxy and propoxy), aryl groups, aryloxy groups (such as a phenoxy group), amino groups, amino groups substituted with one or two substituents or silanyl groups; n is an integer from 0 to 4 and q is an integer from 1 to 40; R' represents

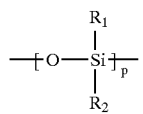

in which p is an integer from 1 to 40 and $R_1$ and $R_2$, which may be identical or different, represent a hydrogen atom, a halogen atom, an alkyl group containing from 1 to 20 carbon atoms, a cycloalkyl group containing from 3 to 20 carbon atoms, an alkoxy group containing from 1 to 20 carbon atoms, an aryl group containing from 6 to 20 carbon atoms, an aryloxy group containing from 6 to 20 carbon atoms, an alkenyl group containing from 2 to 20 carbon atoms, a cycloalkenyl group containing from 3 to 20 carbon atoms, an alkynyl group containing from 2 to 20 carbon atoms, one or more of the hydrogen atoms linked to the carbon atoms of $R_1$ and $R_2$ possibly being replaced with halogen atoms, alkyl groups, alkoxy groups, aryl groups, aryloxy groups, amino groups, disubstituted amino groups or silanyl groups; examples of these groups have already been mentioned above for R; Y represents a halogen atom or a group derived from a chain-limiting agent.

The polymers according to the invention have a structure that is substantially similar to that of the polymers of document EP-B1-0 617 073, with the fundamental exception, however, that the silicon atom of the silylene groups bears, firstly, a hydrogen atom and, secondly, a particular substituent, which is specifically a polysiloxene group

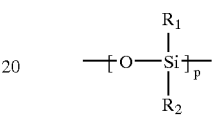

Preferably, $R_1$ and $R_2$ are identical. Also preferably, they represent an alkyl group of 1 to 20 C and more preferably a methyl group.

It has been found that, due to the presence of this specific group, the polymer according to the invention intrinsically had a low viscosity, i.e. a viscosity generally less than 100 mPa.s at 140° C.

This low viscosity is fundamentally obtained by virtue of the polysiloxene group, irrespective of the nature of the group Y; in particular, it is not necessary for Y to be a group derived from a chain-limiting agent.

Specifically, the influence of the specific polysiloxene group is such that the low viscosity is obtained irrespective of the length of the polymer chain.

It should be noted that nowhere in the prior art is there a description of polymers having the specific structure according to the invention and, furthermore, no relationship has ever been established between the presence of the specific polysiloxene groups and the viscosity, and even less so the production of a low viscosity.

The polymers according to the invention may also be differentiated from the polymers of document EP-B1-0 610 073 on account of the presence at the end of the chain of groups Y derived from a chain-limiting agent.

This or these structural difference(s) has (have) very little influence on the advantageous properties of these polymers, in particular the heat-stability properties of the polymer, which are virtually unaffected.

On the other hand, the presence of the specific polysiloxene groups mentioned above has the effect that the polymer (I) or (Ia) according to the invention has fully defined and modifiable Theological properties.

In addition, if the group Y is a group derived from a chain limiter, the presence of this group at the end of the chain will specifically have the effect that the polymer of formula (I) or (Ia) will have a determined length and thus a determined molecular mass that are fully defined, based on its rheological properties.

Y may be H or a halogen atom, such as Cl, I, Br or I, preferably Cl, or another hydrogen.

Y may also be a group derived from a chain-limiting agent.

The nature of the group Y depends on the nature of the chain-limiting agent from which it is derived; in the case of the polymers of formula (I), Y may represent a group of formula (II):

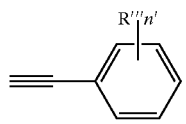

(II)

in which R''' has the same meaning as R and may be identical to or different from the latter, and n' has the same meaning as n and may be identical to or different from the latter.

Alternatively, in the case of the polymers of formula (Ia), Y may represent a group of formula (III):

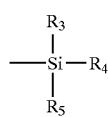

(III)

in which $R_3$, $R_4$ and $R_5$, which may be identical or different, have the same meaning as R, already given above.

One polymer that is particularly preferred of formula (I) according to the invention corresponds to the following formula:

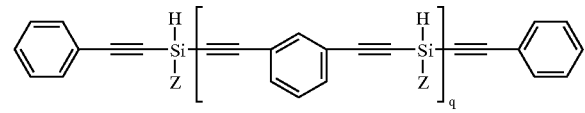

in which Z is

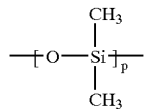

q is an integer from 1 to 40, for example 10, and in which p is an integer from 1 to 40.

The invention also relates to polymers, preferably polymers of determined molecular weight, obtainable by hydrolysing the polymers of formula (Ia), in which Y is a group derived from a chain-limiting agent, and corresponding to formula (Ib) below:

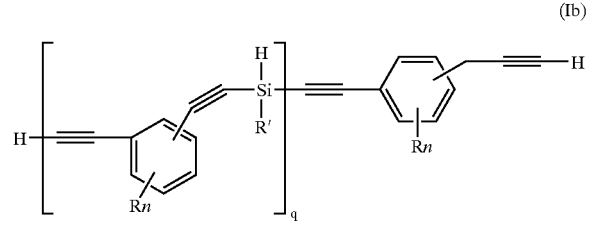

(Ib)

in which R, R', R'', n and q have the meaning already given above.

In the case where the group Y is a group derived from a chain-limiting agent, the molecular mass of the polymers (I) and (Ia) according to the invention is fully defined, and the length of the polymer and thus its molecular weight may be readily controlled by means of dosed additions of chain limiter into the reaction mixture, which is reflected by variable proportions of group Y in the polymer.

Thus, according to the invention, the molar ratio of the (chain-limiting) groups Y at the end of the chain to the ethynylene phenylene ethynylene polysiloxene(silylene) repeating units is generally from 0.01 to 1.5. This ratio is preferably from 0.25 to 1.

Similarly, according to the invention, the molar proportion of the (chain-limiting) groups Y at the end of the chain is generally from 1% to 60% and preferably from 20% to 50% of the polymer of formula (I) or (Ia).

The number-average molecular weight of polymers (I), (Ia) and (Ib) according to the invention, in the general case, is generally from 400 to 1 000 000, and their weight-average molecular weight is generally from 400 to 1 000 000.

The number-average molecular weight of polymers (I), (Ia) and (Ib) according to the invention, in the case where Y is a group derived from a chain-limiting agent and is thus fully defined, is generally from 400 to 50 000, and the weight-average molecular weight is from 600 to 100 000.

These weights are determined by gel permeation chromatography (GPC) via calibration with polystyrene.

The viscosity of the polymer according to the invention, as has been mentioned above, is low, i.e. it is, for example, in the range from 0.1 to 500 mPa.s for temperatures from 50 to 150° C., irrespective of the molecular weight of the polymer, i.e. without it being necessary to use a group Y derived from a chain-limiting agent.

Specifically, the low viscosity is due to the specific polysiloxene groups borne by the silicon.

If it is desired to better define the viscosity of the polymer, this may be achieved by controlling its molecular weight. Specifically, advantageously, due to the presence of groups Y derived from a chain-limiting agent, the molecular weight is generally in the above-mentioned advantageous range, thus making it possible also to fully control the viscosity of the polymers, which is in any case already low enough, due to the presence of the polysiloxene groups, for the desired applications.

The viscosity also depends on the nature of the groups borne by the aromatic rings.

According to the invention, it is thus possible to modify the viscosity of the polymer as desired, as a function of the technological working constraints of the composite.

The viscosity is moreover associated with the glass transition temperature (Tg). The glass transition temperature of the polymers according to the invention will thus generally be from −250 to +10° C.

The invention also relates to a first process for preparing a poly(ethynylene phenylene ethynylene polysiloxene (silylene)) polymer, preferably of determined molecular weight, optionally bearing at the end of the chain groups derived from a chain-limiting agent, said polymer corresponding to formula (I) below:

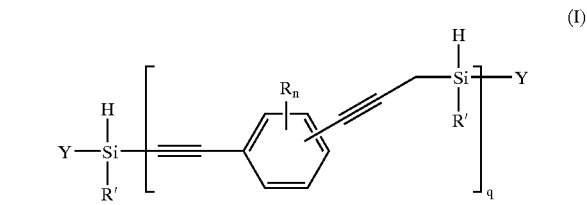

(I)

in which the phenylene group of the central repeating unit may be in the o, m or p form, and R, R', Y, n, p (of R') and q have the meaning already given above.

Said process comprises the reaction of a Grignard reagent of general formula (IV):

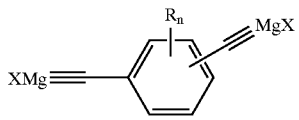
(IV)

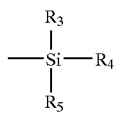
(IX)

in which the phenylene group may be in the o, m or p form, and R and n have the meaning given above for formula (I), and X represents a halogen atom such as Cl, Br or I, optionally as a mixture with a chain-limiting agent of formula:

Y—MgX  (V)

X having the meaning already given above, and Y is a group chosen from the groups of formula:

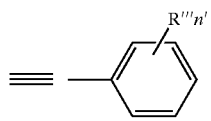
(VI)

in which R''' has the same meaning as R and may be identical to or different from the latter, and n' has the same meaning as n and may be identical to or different from the latter; with a dihalide (dihalosilane) of general formula (VII):

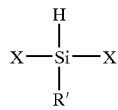
(VII)

in which R' and X have the meaning already given above, in the presence of an aprotic solvent, an optional step of treatment of the product of reaction of compounds (IV) and (VII), in the case where the reaction does not involve a chain-limiting agent, with a monohalosilane, followed by a hydrolysis step to give the final polymer of formula (I).

One variant of the first process according to the invention makes it possible to prepare a poly(ethynylene phenylene ethynylene polysiloxene(silylene)) polymer of formula (Ia):

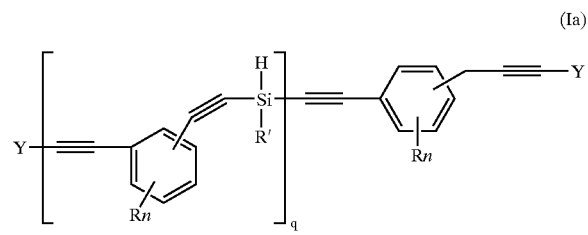
(Ia)

in which the phenylene group of the central repeating unit may be in the o, m or p form, and R, R', Y, p (of R'), q and n have the meaning already given above; said process comprising the reaction of a Grignard reagent of general formula (IV) above and of a dihalide of general formula (VII), already indicated above, optionally as a mixture with a chain-limiting agent of formula:

Y—X  (VIII)

in which X has already been defined above and Y is chosen from among the groups of formula:

in which $R_3$, $R_4$ and $R_5$, which may be identical or different, have the meaning already given above, and in the presence of an aprotic solvent, to give the final polymer of formula (Ia).

The first process of the invention, in this variant and in the case where Y is a group derived from a chain limiter, may also comprise a final step of hydrolysis to give the polymer of formula (Ib) already mentioned above.

The invention also relates to a second process for preparing a poly(ethynylene phenylene ethynylene polysiloxene (silylene)) polymer, preferably of determined molecular weight, optionally bearing at the end of the chain groups derived from a chain-limiting agent, said polymer corresponding to formula (I) below:

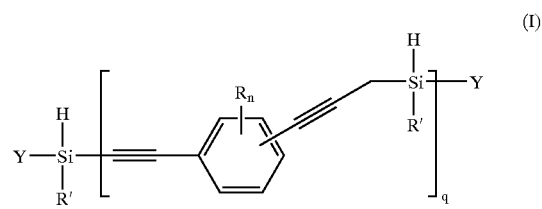
(I)

in which the phenylene group of the central repeating unit may be in the o, m or p form, and R, R', Y, n, q and p (of R') have the meaning already given above.

Said process comprises the reaction of a compound of formula (X):

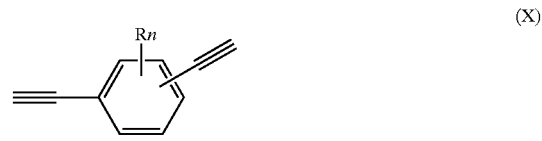
(X)

in which the phenylene group may be in the o, m or p form and R and n have the meaning already given above for formula (I), optionally as a mixture with a chain-limiting agent of formula (XI):

(XI)

in which R''' has the same meaning as R and may be identical to or different from the latter, and n' has the same meaning as n and may be identical to or different from the latter, with a compound of formula (XII):

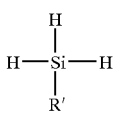

(XII)

in which R' has the meaning already given above, in the presence of a basic metal oxide, to give the final compound of formula (I).

One variant of the second process according to the invention makes it possible to prepare a poly(ethynylene phenylene ethynylene polysiloxene(silylene)) polymer, preferably of determined molecular weight, optionally bearing at the end of the chain, groups derived from a chain-limiting agent, of formula (Ia):

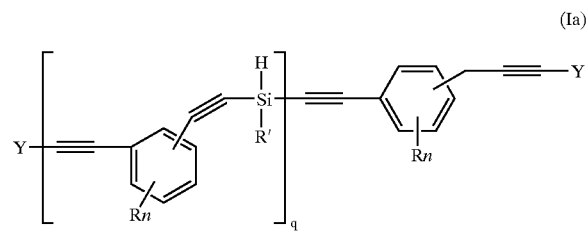

(Ia)

in which the phenylene group of the central repeating unit may be in the o, m or p form, and R, R', Y, q, n and p have the meaning already given above; said process comprising the reaction of a compound of formula (X) already mentioned above with a compound of formula (XII) already mentioned above, optionally as a mixture with a chain-limiting agent (monohydrosilane) of formula (XIII):

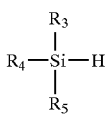

(XIII)

in which $R_3$, $R_4$ and $R_5$, which may be identical or different, have the meaning already given above, in the presence of a basic metal oxide, to give the final compound of formula (Ia).

The second process of the invention, in this variant, may also comprise a final step of hydrolysis to give the polymer of formula (Ib) already mentioned above.

According to the invention, the presence, as a substituent on the silicon atom of the silylene groups, of a polysiloxene group gives the polymers according to the invention, surprisingly, a low and moreover fully controlled viscosity, if Y is a group derived from a chain-limiting agent; in other words, the polymers according to the invention have excellent Theological properties in all cases.

In addition, advantageously, according to the invention, and surprisingly, the control of the weight of the polymers of formulae (I), (Ia) and (Ib) may be obtained by adding to the reaction medium a reactive species, also known as a chain-limiting agent, which blocks the polymerization reaction without affecting the overall reaction yield.

This reactive species is generally an analogue of one of the main reagents, but which bears only one function allowing coupling. When this species is introduced into the polymer chain, the growth is stopped. By effecting dosed additions of chain limiter, it is possible according to the invention to readily control the length of the polymer and, consequently, its viscosity; however, and we again stress this point, the low viscosity of the polymer according to the invention has already been obtained, by virtue of the polysiloxene groups.

The fundamental principle of both the first process according to the invention and the second process according to the invention, in its advantageous embodiment, i.e. controlling the molecular weight and thus the viscosity of the polymer by adding to the reaction mixture a chain-limiting agent, is identical.

The same principle may be applied with minor adjustments to the other possible processes for synthesizing the polymers of formula (I) or (Ia).

Whether it is in the first process or in the second process, in their advantageous embodiments, the length of the polymer and thus its molecular weight, and consequently its viscosity, are in direct correlation with the molar percentage of chain-limiting agent. This molar percentage is defined by the molar ratio of the chain-limiting agent to the total number of moles of chain-limiting agent and of diacetylenic compounds of formula (IV) or (X)×100. This percentage may range from 1% to 60% and preferably from 20% to 50%.

There was no indication in the literature relating to the influence of polysiloxene groups on viscosity. Moreover, there was no indication, in particular in the documents mentioned above, relating to regulating and controlling the molecular weights of polymers of the poly(silylene ethynylene) type, and even less so was there any mention in the prior art documents of a relationship linking the molecular weight distribution to the viscosities of these polymers.

Thus, the fact of choosing, advantageously, to introduce a chain limiter into the polymer synthesis mixture in order to control its molecular weight is neither disclosed nor suggested in the prior art.

In the case of the synthetic process using a metal oxide, as described in documents [1] and [4] and patent EP-B1-0 617 073, and which corresponds substantially to the second preparation process according to the invention, the molecular weight is linked to the degree of activation of the catalyst [4]. Since this catalyst is highly hygroscopic, it is very difficult to predict the molecular masses, in principle. The less active the catalyst the lower the weights, but this decrease is accompanied by a significant decrease in the polymerization reaction yield. Moreover, the distribution may turn out to be so broad that several fractions of different weight may be isolated by selective fractionation.

In the case of synthesis via magnesium reagents, described in document [1] and the abovementioned patent, and which corresponds substantially to the first preparation process according to the invention, it is clear that the molecular weights will be governed by the nature and amount of solvent and also by the reaction temperature. However, these parameters are very difficult to optimize and do not make it possible to vary the weight range significantly. Moreover, the reduction in weights is inevitably accompanied by a large reduction in reaction yield. Finally, the mass distribution is also influenced by the reaction stoichiometry. In the case of synthesis via magnesium reagents, this parameter will be relevant only if one of the two reagents is in very large excess, which will have the consequence of greatly limiting the yield.

According to the invention, advantageously and surprisingly, none of the synthesis parameters mentioned above is modified, and an entirely different synthetic strategy is adopted using in the reaction medium a reactive species that blocks the polymerization reaction without affecting the overall reaction yield.

In addition, when a chain limiter is used, the first preparation process of the invention makes it possible to dispense with one step of the process of EP-B1-0 617 073 which involves a monohalo silyl compound, which induces shorter reaction times and also substantial savings in reagents.

In the general case, in which a chain limiter is not used, the first preparation process is then the same as that described in document EP-B1-0 617 073, i.e. prior to the final hydrolysis, the product of reaction of the Grignard reagent (IV) and of the dihalide (VII) is treated with a monohalide.

The invention also relates to the cured product obtainable by heat-treating at a temperature from 50 to 700° C., the polymer described above.

The cured product is of infinite mass. It is advantageously derived from a polymer with a number-average weight from 500 to 20 000 and a weight-average weight from 600 to 100 000.

Finally, the invention also relates to a composite matrix comprising the polymer described above.

The invention will be understood more clearly on reading the detailed description that follows, which is given for the purpose of non-limiting illustration.

In detail, the first process for preparing a poly(ethynylene phenylene ethynylene polysiloxene(silylene)) polymer according to the invention is substantially analogous to that described in document EP-B1-0 617 073, with the exception, however, of the presence of the polysiloxene substituent and the optional incorporation into this mixture in accordance with the invention of a chain-limiting agent, the final treatment of the polymers and possibly the molar ratio of the organomagnesium and dichlorosilane reagents. As regards the conditions of this process, reference may thus be made to said document EP-B1-0 617 073, which is incorporated into the present patent by reference.

The Grignard reagents of formula (IV) used in the first preparation process according to the invention are especially those described in document EP-B1-0 617 073 on pages 5 to 7 (formulae (3) and (8) to (20)).

The optional chain-limiting agent of formula (V) may be a monoacetylenic organomagnesium compound of formula:

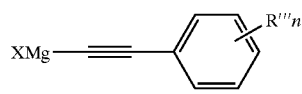

R''', X and n' have already been defined above.

Examples of monohalosilanes are given in patent EP-B1-0 617 073 on page 9 (formula (5)).

Examples of the monoacetylenic compounds from which the monoacetylenic organomagnesium reagents (V) are derived are the following: phenylacetylene, 4-ethynyltoluene, 4-ethynylbiphenyl, 1-ethynyl-4-methoxybenzene.

The Grignard reagent (IV), optionally as a mixture with the chain-limiting compound corresponding to the above formula, is reacted with the dihalosilane of general formula (VII).

Examples of such dihalosilanes are the dichlorosilanes described on pages 7 to 9 of patent EP-B1-0 617 073 and correspond especially to formulae (21) to (26) given in said document. However, it should be noted that, fundamentally, according to the invention, one of the substituents of these dihalosilanes is necessarily H and the other substituent is a specific polysiloxene group, which is not the case in the abovementioned patent.

The conditions of the polymerization reaction are such that the solvent, the reaction time, the temperature, etc. (with the exclusion of the "post-treatment") are substantially the same as those described in document EP-B1-0 617 073 to which reference is made, in particular to page 14. The only differences in this actual polymerization step concern, besides the specific polysiloxene group, the optional addition of an additional chain-limiting reagent.

The reaction conditions are otherwise substantially the same.

However, and according to the invention, preferably, the ratio of the number of acetylenic functions to the number of halogen functions borne by the silane must be as close as possible to 1 and preferably from 0.9 to 1.1. The molar ratio of phenylacetylene to diethynylbenzene is preferably between 0.01 and 1.5 and ideally between 0.25 and 1 (percentage from 1% to 60%).

This also applies to the case of the variant of the first process in which the chain limiter is a monohalosilane.

According to the invention, and in the case where a chain limiter is used, irrespective of the one used, following the polymerization reaction, a final hydrolysis step is performed directly, and one step is thus dispensed with in this case compared with the similar process of the prior art, in particular in the case in which the chain limiter is an organomagnesium reagent.

Specifically, in document EP-B1-0 617 073, a post-treatment is performed on the polymer already prepared, the molecular weight of which is set, with a monohalosilane followed by a hydrolysis. It should be noted that, in this case, the monohalosilane does not act as a chain limiter since, in contrast with the present invention—in the advantageous case in which a chain limiter is used—, it is not included in the starting reaction mixture and its action has no influence on the molecular weight of the polymer.

However, in the most general case of preparing the polymers according to the invention, in which a chain limiter is not used, the process is performed in the same manner as in the abovementioned EP patent, with treatment of the polymerization product with a monohalosilane and hydrolysis.

According to the invention, at the end of the reaction, the polymer (with chain-limiting groups) is hydrolysed with a volume, for example from 0.1 to 50 ml per gram of polymer, of an acidic solution, for example about 0.01 to 10 N hydrochloric acid or sulphuric acid.

The ideal solvent is tetrahydrofuran. In this case, the reaction mixture is then decanted and the solvent of the organic phase is replaced with a volume, for example from 0.1 to 100 ml per gram of polymer and ideally from 1 to 10 ml per gram of polymer, of any type of water-immiscible solvent, such as xylene, toluene, benzene, chloroform, dichloromethane or an alkane containing more than 5 carbons. In the case of a reaction performed in a water-immiscible solvent, this step may be omitted. The organic phase is then washed, for example 1 to 5 times and preferably 2 to 3 times, with a volume of water, for example from 0.1 to 100 ml per gram of polymer and ideally from 1 to 10 ml per gram of polymer, so as to neutralize the organic phase and to extract therefrom all the impurities such as the magnesium salts and halogen salts. The pH of the organic phase should preferably be between 5 and 8 and ideally between 6.5 and 7.5. After evaporating off the solvent, the polymer is dried under a vacuum of between 0.1 and 500 mbar at a temperature of between 20 and 150° C. for a period of between 15 minutes and 24 hours.

The second process for preparing the polymers of formula (I) is a process involving a dehydrogenation in the presence of a basic metal oxide.

Such a process differs from the similar process described in documents [1] and [4] and also in document EP-B1-0 617 073 only in that a chain-limiting agent is optionally added to the reaction mixture, and fundamentally by the presence of polysiloxene groups in one of the reagents.

The reaction mixture comprises a compound of formula (X), for example: 1,3-diethynylbenzene, and optionally a chain-limiting agent which is, in this second process, a monoacetylene (XI) similar to that already described above for the first process.

Compound (X), optionally as a mixture with the chain-limiting agent, reacts with a trihydrosilane of formula (XII).

The basic metal oxide used is preferably chosen from oxides of alkali metals or of alkaline-earth metals, lanthanide oxides and scandium, yttrium, thorium, titanium, zirconium, hafnium, copper, zinc and cadmium oxides, and mixtures thereof.

Examples of such oxides are given in document EP-B1-0 617 073 on pages 16 and 17, to which reference is explicitly made herein. These oxides may be subjected to an activation treatment as described in patent EP-B-1-0 617 073.

The cured products prepared by heat-treating the polymers according to the invention are, for example, produced by melting this polymer or by dissolving it in a suitable solvent, and then by optionally placing it in the desired form and heating it in a gaseous atmosphere of air, of nitrogen or of an inert gas such as argon or helium.

The treatment temperature generally ranges from 50 to 700° C., preferably from 100 to 400° C. and more preferably from 150 to 350° C., and the heating is generally performed for a period of from one minute to 100 hours.

The curing reaction may optionally be performed in the presence of a curing agent and the polymer according to the invention may also be mixed with other resins or polymers.

On account of the similar structure of the polymers according to the invention and of the polymers of document EP-B1-0 617 073, their curing process is substantially identical and reference may be made to page 17 of said document for further details.

The preparation of composites with an organic matrix comprising the polymer of the invention is detailed hereinbelow.

The invention will now be described with reference to the examples that follow, which are given as nonlimiting illustrations.

EXAMPLE 1

Preparation of Poly([hexamethyltrisiloxene]silylene ethynylene phenylene ethynylene)

25.88 g (257 mmol) of bromoethane dissolved in 100 ml of anhydrous THF are added dropwise, so as to maintain reflux, into a 1 liter three-necked round-bottomed flask placed under argon, and containing 6.4 g (263 mmol) of magnesium powder suspended in 100 ml of anhydrous THF. Refluxing is maintained for one hour after the end of the addition. 14.1 g (113 mmol) of 1,3-diethynylbenzene dissolved in 100 ml of anhydrous THF are then added dropwise and left stirring at reflux for one hour.

36.5 g (113 mmol) of dichlorohexamethyltrisiloxene-silane dissolved in 100 ml of anhydrous THF are then added dropwise under reflux. The solution is then stirred at reflux for one hour. The polymer thus formed is then hydrolysed by adding 50 ml of hydrochloric acid at a concentration of 35% by mass dissolved in 100 ml of water. The reaction medium is separated into two fractions, an aqueous fraction and an organic fraction. The aqueous phase is then subjected to a change of solvent, the THF being replaced with 200 ml of chloroform. The polymer dissolved in the chloroform is then washed three times with 100 ml of water. The organic solution is then dehydrated by passing it through a bed of magnesium sulphate. The polymer is then obtained by evaporating off the solvent. The polymer is finally purified by drying under 0.4 mbar at 20° C. 34 g (80% yield) of polymer are thus obtained, in the form of a yellow oil.

The number-average molecular weight of this compound is 11 500 for a weight-average mass of 5500 (polydispersity of 2.1). These weights were determined by GPC via calibration with polystyrene.

EXAMPLE 2

Preparation of poly([hexamethyltrisiloxene]silylene ethynylene phenylene ethynylene) Containing a Chain End of Aromatic Acetylene Type with 20 mol % of Chain Limiter 25.88 g (257 mmol) of bromoethane dissolved in 100 ml of anhydrous THF are added dropwise, so as to maintain reflux, into a 1 liter three-necked round-bottomed flask placed under argon, and containing 6.4 g (263 mmol) of magnesium powder suspended in 100 ml of anhydrous THF. Refluxing is maintained for one hour after the end of the addition. A mixture of 12.67 g (100.6 mmol) of 1,3-diethynylbenzene and 2.56 g (25.1 mmol) of phenylacetylene dissolved in 100 ml of anhydrous THF are then added dropwise and left stirring at reflux for one hour.

36.5 g (113 mmol) of dichlorohexamethyltrisiloxene-silane dissolved in 100 ml of anhydrous THF are then added dropwise under reflux. The solution is then stirred at reflux for one hour. The polymer thus formed is then hydrolysed by adding 50 ml of hydrochloric acid at a concentration of 35% by mass dissolved in 100 ml of water. The reaction medium is separated into two fractions, an aqueous fraction and an organic fraction. The aqueous phase is then subjected to a change of solvent, the THF being replaced with 200 ml of chloroform. The polymer dissolved in the chloroform is then washed three times with 100 ml of water. The organic solution is then dehydrated by passing it through a bed of magnesium sulphate. The polymer is then obtained by evaporating off the solvent. The polymer is finally purified by drying under 0.4 mbar at 20° C. 33 g (78% yield) of polymer are thus obtained, in the form of a yellow oil.

The number-average molecular weight of this compound is 5000 for a mass-average weight of 2150 (polydispersity of 2.3). These weights were determined by GPC via calibration with polystyrene.

References

[1] "New Highly Heat-Resistant Polymers containing Silicon:Poly(silyleneethynylenephenylene ethynylene)s" by ITOH M., INOUE K., IWATA K., MITSUZUKA M. and KAKIGANO T., Macromolecules, 1997, 30, pp. 694–701.

[2] CORRIU Robert J. P. et al., Journal of polymer science:Part C:Polymer Letters, 1990, 28, pp. 431–437.

[3] "Copper [1] chloride catalyzed cross dehydrocoupling reactions between silanes and ethynyl compounds. A new method for the copolymerization of silanes and alkynes" by Liu H. Q.;HARROD J. F. The Canadian Journal of Chemistry, 1990, vol. 68, pp. 1100–1105.

[4] "A novel synthesis and extremely high Thermal stability of Poly[(phenylsilylene)-(ethynylene1,3-phenylene ethynylene)]" by ITOH M., INOUE K., IWATA K., MIT- SUZUKA M., KAKIGANO T. Macromolecules, 1994, 27, pp. 7917–7919.

What is claimed is:

1. A poly(ethynylene phenylene ethynylene polysiloxene (silylene)) polymer, said polymer corresponding to formula (I) below:

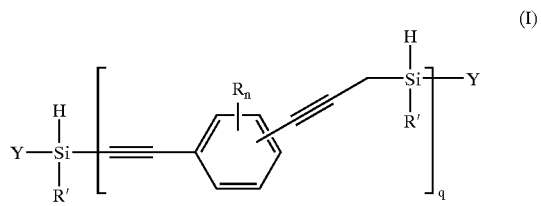

or to formula (Ia) below:

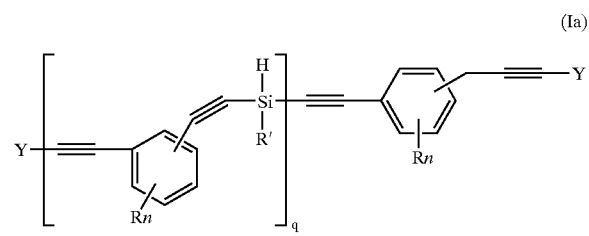

in which the phenylene group of the central repeating unit may be in the o, m or p form; R represents a halogen atom, a linear or branched alkyl group containing from 1 to 20 carbon atoms, a cycloalkyl group containing from 3 to 20 carbon atoms, an alkoxy group containing from 1 to 20 carbon atoms, an aryl group containing from 6 to 20 carbon atoms, an aryloxy group containing from 6 to 20 carbon atoms, a linear or branched alkenyl group containing from 2 to 20 carbon atoms, a cycloalkenyl group containing from 3 to 20 carbon atoms, an alkynyl group containing from 2 to 20 carbon atoms, an amino group, an amino group substituted with one or two substituents containing from 2 to 20 carbon atoms or a silanyl group containing from 1 to 10 silicon atoms, further, wherein one or more hydrogen atoms linked to the carbon atoms of R, may be replaced with one or more halogen atoms, alkyl groups, alkoxy groups, aryl groups, aryloxy groups, amino groups, amino groups substituted with one or two substituents or silanyl groups;

n is an integer from 0 to 4 and q is an integer from 1 to 40;

R' represents:

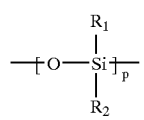

in which p is an integer from 1 to 40 and $R_1$ and $R_2$, which may be identical or different, represent a hydrogen atom, a halogen atom, an alkyl group containing from 1 to 20 carbon atoms, a cycloalkyl group containing from 3 to 20 carbon atoms, an alkoxy group containing from 1 to 20 carbon atoms, an aryl group containing from 6 to 20 carbon atoms, an aryloxy group containing from 6 to 20 carbon atoms, an alkenyl group containing from 2 to 20 carbon atoms, a cycloalkenyl group containing from 3 to 20 carbon atoms, an alkynyl group containing from 2 to 20 carbon atoms, wherein one or more of the hydrogen atoms linked to the carbon atoms of $R_1$ and $R_2$ may be halogen atoms, alkyl groups, alkoxy groups, aryl groups, aryloxy groups, amino groups, disubstituted amino groups or silanyl groups; Y may represent a halogen atom, a halogen atom or a group derived from a chain-limiting agent.

2. The polymer according to claim 1, in which $R_1$ and $R_2$ are identical.

3. The polymer according to claim 2, in which $R_1$ and $R_2$ are a methyl group.

4. The polymer of formula (I) according to claim 1, in which Y, which is a group derived from a chain-limiting agent, represents a group of formula (II):

in which R''' has the same meaning as R and may be identical to or different from the latter, and n' has the same meaning as n and may be identical to or different from the latter.

5. The polymer of formula (Ia) according to claim 1, in which Y, which is a group derived from a chain-limiting agent, represents a group of formula (III):

in which $R_3$, $R_4$ and $R_5$, which may be identical or different and may have the meaning of R.

6. The polymer according to claim 1, corresponding to the following formula:

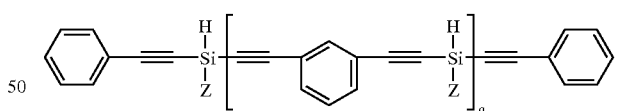

in which Z is

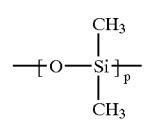

q is an integer from 1 to 40, and in which p is an integer from 1 to 40.

7. The polymer according to claim 5, obtainable by hydrolysis of a polymer of formula (Ia), in which Y is a group derived from a chain-limiting agent, said polymer corresponding to formula (Ib) below:

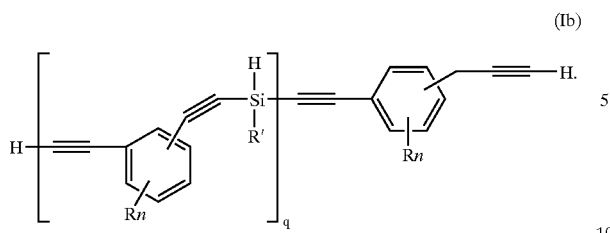

(Ib)

8. The polymer according to claim 1, in which the molar ratio of the chain-limiting groups Y at the end of the chain to the ethynylene phenylene ethynylene polysiloxene (silylene) repeating units is from 0.01 to 1.5.

9. The polymer according to claim 1, in which the molar proportion of the chain-limiting groups Y at the end of the chain is from 1% to 60%.

10. The polymer according to claim 1, having a number-average molecular weight from 400 to 1,000,000.

11. The polymer according to claim 1, having a weight-average molecular weight from 400 to 1,000,000.

12. The polymer according to claim 1, in which Y is a chain-limiting group, and the number-average molecular weight of which is from 400 to 50,000 and the weight-average molecular weight of which is from 600 to 100,000.

13. The polymer according to claim 1, having a viscosity from 0.1 to 500 mPa.s at a temperature from 150 to 50° C.

14. The polymer according to claim 1, having a glass transition temperature Tg from −250 to +10° C.

15. A process for preparing a poly(ethynylene phenylene ethynylene silylene) polymer optionally bearing at the end of the chain groups derived from a chain-limiting agent, said polymer corresponding to formula (I) of claim 1:

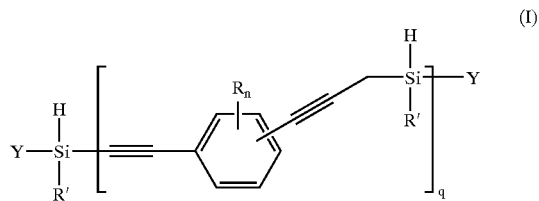

(I)

said process comprising the reaction of a Grignard reagent of formula (IV):

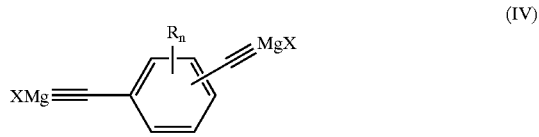

(IV)

in which the phenylene group may be in the o, m or p form, and X represents a halogen atom optionally as a mixture with a chain-limiting agent of formula:

Y—MgX     (V)

X having the meaning already given above, and Y is a group chosen from the groups of formula:

(VI)

in which R''' has the same meaning as R and may be identical to or different from the latter, and n' has the same meaning as n and may be identical to or different from the latter;

with a dihalide of formula (VII):

(VII)

in the presence of an aprotic solvent, an optional step of treatment of the product of reaction of compounds (IV) and (VII), in the case where the reaction does not involve a chain-limiting agent, with a monohalosilane, followed by a hydrolysis step to give the final polymer of formula (I).

16. A process for preparing a poly(ethynylene phenylene ethynylene silylene) polymer optionally bearing at the end of the chain groups derived from a chain-limiting agent, said polymer corresponding to formula (Ia) of claim 1:

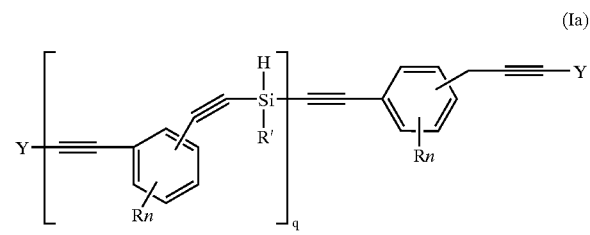

(Ia)

said process comprising the reaction of a Grignard reagent of formula (IV) and of a dihalide of formula (VII):

(VII)

optionally as a mixture with a chain-limiting agent of formula:

Y—X     (VIII)

in which X represents a halogen atom such as Cl, Br or I and Y is chosen from among the groups of formula:

(IX)

in which $R_3$, $R_4$ and $R_5$, which may be identical or different, in the presence of an aprotic solvent, to give the final polymer of formula (Ia).

17. The process according to claim 16, also comprising a final step of hydrolysis, whereby the polymer of formula (Ib) is obtained:

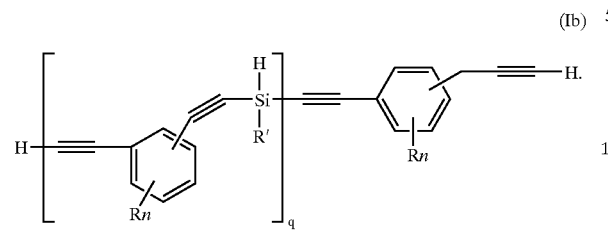
(Ib)

18. A process for preparing a poly(ethynylene phenylene ethynylene polysiloxene(silylene)) polymer optionally bearing at the end of the chain groups derived from a chain-limiting agent, said polymer corresponding to formula (I) of claim 1:

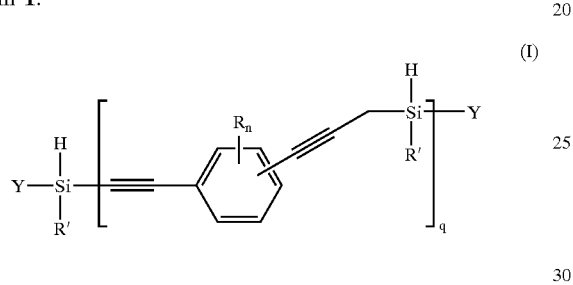
(I)

said process comprising the reaction of a compound of formula (X):

(X)

in which the phenylene group may be in the o, m or p form, optionally as a mixture with a chain-limiting agent of formula (XI):

(XI)

in which R''' has the same meaning as R and may be identical to or different from the latter, and n' has the same meaning as n and may be identical to or different from the latter, with a compound of formula (XII):

(XII)

in the presence of a basic metal oxide, to give the final compound of formula (I).

19. A process for preparing a poly(ethynylene phenylene ethynylene polysiloxene(silylene)) polymer optionally bearing at the end of the chain, groups derived from a chain-limiting agent, said polymer corresponding to formula (Ia) of claim 1:

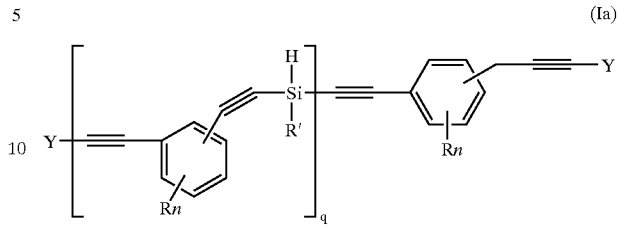
(Ia)

said process comprising the reaction of a compound of formula (X):

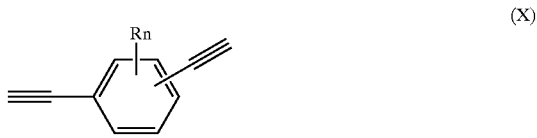
(X)

in which the phenylene group may be in the o, m or p form, with a compound of formula (XII):

(XII)

optionally as a mixture with a chain-limiting agent (monohydrosilane) of formula (XIII):

(XIII)

in which $R_3$, $R_4$ and $R_5$, which may be identical or different, in the presence of a basic metal oxide, to give the final compound of formula (Ia).

20. The process according to claim 19, further comprising a final step of hydrolysis, whereby the polymer of formula (Ib):

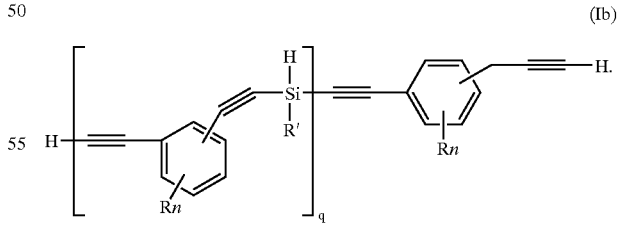
(Ib)

is obtained.

21. The process according to claim 15, in which the molar percentage of the chain-limiting agent in the mixture of diacetylenic compounds of formula (IV) or (X) and of chain limiter is from 1% to 60%.

22. A cured product obtainable by heat-treating, at a temperature from 50 to 700° C., the polymer according to claim 1.

23. A composite matrix comprising the polymer according to claim 1.

24. The process according to claim 18, in which the molar percentage of the chain-limiting agent in the mixture of diacetylenic compounds of formula (IV) or (X) and a chain limiter is from 1% to 60%.

25. The polymer of claim 7, wherein Y is a chain-limiting agent and the polymer has a controlled molecular weight.

26. The process of claim 15, wherein Y is a chain-limiting agent and the polymer has a controlled molecular weight.

27. The process of claim 16, wherein Y is a chain-limiting agent and the polymer has a controlled molecular weight.

28. The process of claim 18, wherein Y is a chain-limiting agent and the polymer has a controlled molecular weight.

29. The process of claim 19, wherein Y is a chain-limiting reagent and the polymer has a controlled molecular weight.

30. The polymer of claim 1, wherein R is at least one of a halogen atom selected from the group consisting of F, Cl, Br and I; a linear or branched alkyl group selected from the group consisting of a methyl group, an ethyl group, a propyl group, a butyl group and a cyclohexyl group; an ailcoxy group selected from the group consisting of methoxy, ethoxy and propoxy; a phenyl group; a phenoxy group; an alkenyl group selected from the group consisting of vinyl, allyl and cyclohexenyl; an alkynyl group selected from the group consisting of ethynyl and propargyl; an amino group selected from the group consisting of dimethylamino, diethylamino, ethylmethylamino and methylphenylamino; or a silanyl group selected from the group consisting of silyl, disilanyl, dimethylsilyl, trimethylsilyl and tetramethyldisilanyl wherein one or more hydrogen atoms linked to the carbon atoms of R may be replaced by a halogen atom selected from the group consisting of F, Cl, Br and I; an alkoxy group selected from the group consisting of methoxy, ethoxy and propoxy; or a phenoxy group.

31. The polymer according to claim 2, wherein $R_1$ and $R_2$ represent an alkyl group of 1 to 20 carbon atoms.

32. The polymer according to claim 8, wherein the molar ratio is from 0.25 to 1.

33. The polymer according to claim 9, wherein the molar proportion is from 20% to 50%.

34. The process according to claim 15, wherein X is a halogen atom selected from the group consisting of Cl, Br and I.

35. The process according to claim 16, wherein X is a halogen atom selected from the group consisting of Cl, Br and I.

36. The process according to claim 21, wherein the molar percentage is from 20% to 50%.

37. The process according to claim 24, wherein the molar percentage is from 20% to 50%.

* * * * *